United States Patent
Kwon et al.

(10) Patent No.: US 10,649,518 B2
(45) Date of Patent: May 12, 2020

(54) ADAPTIVE POWER CONTROL LOOP

(71) Applicant: ATI Technologies ULC, Markham (CA)

(72) Inventors: Soon Kyu Kwon, North York (CA); Jun Huang, Richmond Hill (CA); Shahriar Pezeshgi, Markham (CA); Alexander Sabino Duenas, Stouffville (CA)

(73) Assignee: ATI TECHNOLOGIES ULC, Markham (CA)

( * ) Notice: Subject to any disclaimer, the term of this patent is extended or adjusted under 35 U.S.C. 154(b) by 17 days.

(21) Appl. No.: 15/416,955

(22) Filed: Jan. 26, 2017

(65) Prior Publication Data

US 2018/0210530 A1   Jul. 26, 2018

(51) Int. Cl.
  *G06F 1/3234*    (2019.01)
  *G06F 1/3206*    (2019.01)
  (Continued)

(52) U.S. Cl.
  CPC .......... *G06F 1/3234* (2013.01); *G06F 1/3206* (2013.01); *G06T 1/20* (2013.01);
  (Continued)

(58) Field of Classification Search
  CPC ...... G06F 1/324; G06F 1/3206; G06F 1/3296; G06F 1/3265; G06F 1/329; G06F 1/3275;
  (Continued)

(56) References Cited

U.S. PATENT DOCUMENTS 6,895,520 B1   5/2005   Altmejd
7,903,116 B1   3/2011   Klock et al.
(Continued)

FOREIGN PATENT DOCUMENTS

WO   WO-0143264 A1 *   6/2001   .......... H02M 3/1588
WO   WO-2014209757 A1 *   12/2014   .......... G06F 3/0436

OTHER PUBLICATIONS

European Search Report correlating to 17154351.5-1879, dated Aug. 3, 2017, 4 pages.
(Continued)

*Primary Examiner* — Julie Anne Watko (57) ABSTRACT

A GPU performs dynamic power level management by switching between pre-defined power levels having distinct clock and voltage levels. The dynamic power level management includes identifying a first performance metric associated with processing workloads at the for a consecutive number of measurement cycles. In some embodiments, the consecutive number of measurement cycles includes a current measurement cycle and at least one previous measurement cycle. Based on a determination that the consecutive number of measurement cycles exceeds a minimum hysteresis number, an estimated optimization is determined to be applied to the GPU for a future measurement cycle. A power level setting at the GPU for the future measurement cycle is adjusted based on the estimated optimization. By considering performance metrics including, for example, different processing workloads and hardware configurations, the GPU is able to dynamically adapt its power settings to the particular workload that it is currently processing.

17 Claims, 4 Drawing Sheets

(51) Int. Cl.
*G06F 1/324* (2019.01)
*G06F 1/3218* (2019.01)
*G06T 1/20* (2006.01)

(52) U.S. Cl.
CPC ............ *G06F 1/324* (2013.01); *G06F 1/3218* (2013.01); *G06F 1/3265* (2013.01); *Y02D 10/126* (2018.01)

(58) Field of Classification Search
CPC .... G06F 1/3218; G06F 1/3225; G06F 1/3234; G06F 1/3203; G06F 1/32; G06F 1/26; G06F 1/206; G06F 1/02; G06F 1/00; G06F 1/3293; G06F 1/3287; G06T 1/00; G06T 1/20; Y02D 10/126; Y02D 10/124; Y02D 10/12; Y02D 10/10; Y02D 10/00
See application file for complete search history.

(56) References Cited

U.S. PATENT DOCUMENTS

| | | | |
|---|---|---|---|
| 9,170,912 B1* | 10/2015 | Hu | G06F 11/3062 |
| 10,037,070 B2* | 7/2018 | Wang | G06F 1/3265 |
| 2002/0133729 A1 | 9/2002 | Therien | |
| 2010/0299545 A1 | 11/2010 | Lyu | |
| 2011/0113269 A1 | 5/2011 | Park | |
| 2012/0297232 A1 | 11/2012 | Bircher | |
| 2012/0324248 A1 | 12/2012 | Schluessler | |
| 2013/0159741 A1* | 6/2013 | Schluessler | G06F 1/3253 713/320 |
| 2013/0268786 A1* | 10/2013 | Allen-Ware | G06F 1/3296 713/320 |
| 2013/0328890 A1 | 12/2013 | Avkarogullari et al. | |
| 2014/0071141 A1 | 3/2014 | Hunkins et al. | |
| 2014/0089699 A1 | 3/2014 | O'Connor | |
| 2014/0132235 A1* | 5/2014 | Zhao | G06F 1/26 323/283 |
| 2014/0184619 A1* | 7/2014 | Kim | G06T 1/20 345/519 |
| 2014/0223219 A1* | 8/2014 | Aelion | G06F 1/3206 713/400 |
| 2015/0015589 A1* | 1/2015 | Chung | G06F 1/324 345/501 |
| 2015/0149800 A1* | 5/2015 | Gendler | G06F 1/324 713/322 |
| 2015/0261583 A1* | 9/2015 | Vanka | G06F 9/54 719/313 |
| 2016/0116954 A1 | 4/2016 | Zhuang | |
| 2016/0231863 A1* | 8/2016 | Huang | G06F 3/0412 |
| 2016/0266628 A1* | 9/2016 | Jain | G06F 1/28 |
| 2016/0349828 A1 | 12/2016 | Weissmann et al. | |
| 2017/0010946 A1* | 1/2017 | Orakwue | G06F 11/3409 |
| 2017/0199542 A1* | 7/2017 | Sylvester | G06F 1/08 |
| 2018/0018118 A1* | 1/2018 | Raghava | G06F 1/324 |
| 2018/0137668 A1* | 5/2018 | Mercati | G06F 9/44 |

OTHER PUBLICATIONS

Office action dated Aug. 22, 2017 for European Application No. 17154351.5, 6 pages.
Office action dated Feb. 19, 2018 for European Application No. 17154351.5, 7 pages.
International Search Report and Written Opinion dated May 11, 2018 for PCT Application No. PCT/IB2018/050467, 8 pages.
Summons to Attend Oral Proceedings dated Oct. 2, 2018 for corresponding European Applicatino No. EP 17154351.5, 8 pages.
International Preliminary Report on Patentability dated Aug. 8, 2019 for International Application No. PCT/IB2018/050467, 6 pages.

\* cited by examiner

| BUSY % RANGE (302) | ADJUST FACTOR MAF = 5 THRESHOLD = 50% (304) | ADJUST FACTOR MAF = 10 THRESHOLD = 50% (306) | ADJUST FACTOR MAF = 10 THRESHOLD = 30% (308) |
|---|---|---|---|
| 0-10% | 5 | 10 | START AT 10 FOR 0-3%, AND THEN DECREASE BY 1 FOR EVERY 3% UP TO BUSY RANGE OF 30% |
| 10-20% | 4 | 8 | |
| 20-30% | 3 | 6 | |
| 30-40% | 2 | 4 | START AT 0 FOR 30-37%, AND THEN INCREASE BY 1 FOR EVERY 7% INCREASE IN BUSY RANGE |
| 40-50% | 1 | 2 | |
| 50-60% | 1 | 2 | |
| 60-70% | 2 | 4 | |
| 70-80% | 3 | 6 | |
| 80-90% | 4 | 8 | |
| 90-100% | 5 | 10 | |

ADAPTIVE POWER CONTROL LOOP

BACKGROUND

Field of the Disclosure

The present disclosure relates generally to power management and more particularly to power management in graphics processing units (GPUs).

Description of the Related Art

Processors are increasingly used in environments where it is desirable to optimize power consumption. For example, a processor is an important component of computing-enabled smartphones, laptop computers, portable gaming devices, and the like, wherein minimization of power consumption is desirable in order to extend battery life. It is also common for a processor to incorporate a graphics processing units (GPU) to enhance the graphical functionality of the processor. The GPU allows the electronic device to display complex graphics at a relatively high rate of speed, thereby enhancing the user experience. However, the GPU can also increase the power consumption of the processor.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-4 illustrate techniques for dynamic power level management at a GPU of a processing system by enabling the adjustment of power management settings to changing clock and voltage levels according to the particular workloads that the GPU is currently processing. In each measurement cycle, the GPU driver takes input from both measured hardware performance metrics (e.g., average utilization, temperature, and power that accumulated in the previous cycle) and data representative of the current computing environment (e.g., type of workload requested by system, performance measurements such as frames per second (FPS), throughput, or submissions per unit time) to calculate power level settings (i.e., operating parameters that govern operations of the GPU, such as clock frequency or operating voltage) to be used in the next cycle. In some embodiments, the calculated settings can include rates at which clocks can change frequencies (up/down hysteresis), activity thresholds for changing clock frequencies, etc.

In some embodiments, the dynamic power level management includes identifying a first performance metric associated with processing workloads at the processing system for a consecutive number of measurement cycles. The consecutive number of measurement cycles includes a current measurement cycle and at least one previous measurement cycle. Based on a determination that the consecutive number of measurement cycles exceeds a minimum hysteresis number, an estimated optimization is determined to be applied to the GPU for a future measurement cycle. A power level setting at the GPU for the future measurement cycle is adjusted based on the estimated optimization. By considering performance metrics including, for example, different processing workloads and hardware configurations, the GPU is able to dynamically adapt its power settings to the particular workload that it is currently processing.

In contrast to the techniques disclosed herein, conventional processors can change power settings of a GPU based on static settings using predefined metrics and thresholds. However, such conventional techniques do not account for different operating environments (e.g., differences in operating systems, ambient temperatures, different workloads for different applications and/or use cases encountered during run-time, different hardware configurations, etc.). By enabling consideration of metrics including run-time hardware performance and inputs such as identification of the particular processing workloads, the techniques disclosed herein allow for the GPU to tailor power level settings to better optimize for both power savings and performance increases.

As used herein, the term "processing workload" refers to a type and an amount of work done by a GPU for a given time interval, wherein as the GPU does more work in the given amount of time, the processing workload increases. In some embodiments, the processing workload includes at least two components: a current processing workload and an expected future processing workload. The current processing workload refers to the processing workload the GPU is currently experiencing when the current processing workload is measured, or the processing workload the GPU has experienced in the relatively recent past. In some embodiments, the current processing workload is identified based on the amount of activity at one or more individual modules of the GPU, such as based on the percentage of active vs. idle compute units, over a given amount of time, in processor core of the GPU. The expected future processing workload refers to the processing workload the GPU is expected to experience in the relatively near future. In some embodiments, the expected future processing workload is identified based on a number of threads scheduled for execution at the GPU.

Figure 1:
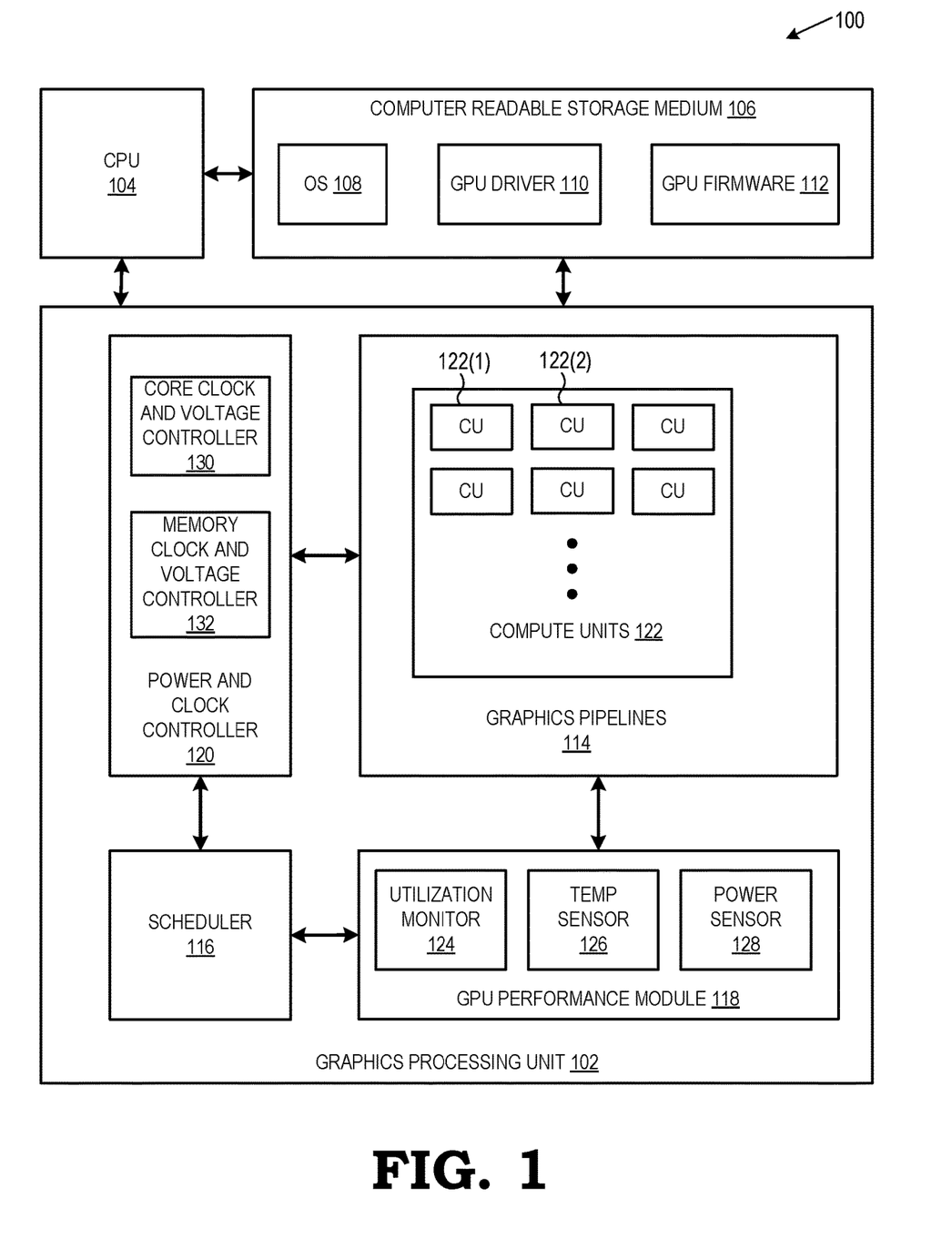
FIG. 1 is a block diagram of a processing system that employs adaptive power control in accordance with some embodiments.

FIG. 1 is a block diagram of a processing system 100 in accordance with some embodiments. The processing system includes a graphics processing unit (GPU) 102 coupled to other system components, such as one more general-purpose processor cores (not shown) at a central processing unit (CPU) 104, a computer readable storage medium 106, or one or more other modules not illustrated at FIG. 1, including other memory devices such as memory modules configured to form a cache, interface modules such as a northbridge or southbridge, and the like. For example, in various embodiments, the GPU 102 is coupled to a GPU memory (not shown), such as a random-access memory (RAM) that operates as a frame buffer. The GPU 102 can be part of any of a variety of electronic devices, such as a computer, server, compute-enabled portable phone, game console, and the like. Generally, the computer readable storage medium 106 includes any storage media accessible by the processing system 100 during use to provide instructions and/or data to the processing system 100.

The computer readable storage medium 106 stores an operating system (OS) 108, a GPU driver 110, and a GPU firmware 112. Each of the operating system 108, the GPU driver 110, and the GPU firmware 112 includes instructions which, when executed in the processing system 100, implements the operation described herein. In one embodiment, the OS 108 and the GPU driver 110 are executed at the CPU 104, and the GPU firmware is executed at the GPU 102 (e.g, on one or more processor cores of the GPU 102 (not shown)). In other embodiments, the OS 108 is executed at the CPU 104, and the GPU driver 110 and the GPU firmware 112 are both executed at the GPU 102 (e.g., on one or more processor cores of the GPU 102 (not shown)). However, one of ordinary skill in the art will recognize that, in various embodiments, any of the operating system 108, the GPU driver 110, and the GPU firmware 112 are implemented elsewhere in the processing system 100 without departing from the scope of the present disclosure. In some embodiments, the GPU driver 110 is a software module that controls how the GPU 102 interacts with other components or modules in the processing system 100. In particular, the GPU driver 110 provides an interface between the GPU 102 and the operating system 108 and/or hardware of a device (e.g., processing system 100) that includes the GPU 102.

To support processing of graphics workloads, the GPU 102 includes a graphics pipeline 114, a scheduler 116, and a GPU performance module 118, and a power and clock controller module 120. In the depicted example, the graphics pipelines 114 are generally configured to execute threads of instructions to perform graphics-related tasks, including tasks such as processing graphics workloads, and the like. In at least one embodiment, the GPU driver 110 supplies graphics workloads to the graphics pipeline 114 for processing. The graphics workloads (not shown) are a set of graphics instructions that, when executed, result in the GPU 102 generating one or more objects for display. For example, the graphics workloads may be threads of instructions for rendering a frame or portion of a frame of video or static graphics.

To facilitate execution of the threads, the graphics pipelines 114 include compute units (CUs) 122. In some embodiments, the graphics pipelines 114 may include additional modules not specifically illustrated at FIG. 1, such as buffers, memory devices (e.g. memory used as a cache or as scratch memory), interface devices to facilitate communication with other modules of the GPU 102, and the like. Each of the CUs 122 (e.g., CU 122(1) and 122(2)) is generally configured to execute instructions in a pipelined fashion on behalf of the GPU 102. Further, each of the CUs 122 may include additional modules not specifically illustrated at FIG. 1, such as fetch and decode logic to fetch and decode instructions on behalf of the CU, a register file to store data for executing instructions, cache memory, and the like.

The scheduler 116 receives requests to execute threads at the GPU 102 and schedules those threads for execution at the graphics pipelines 114. In some embodiments, the requests are received from a processor core in the CPU 104. The scheduler 116 buffers each received request until one or more of the CUs 122 is available to execute the thread. When one or more of the CUs 122 is available to execute a thread, the scheduler 116 initiates execution of the thread by, for example, providing an address of an initial instruction of the thread to a fetch stage of the one or more of the CU (e.g., CU 122(1)).

The GPU performance module 118 monitors performance characteristics at the GPU 102, including the monitoring of performance characteristics at the graphics pipelines 114 and at the scheduler 116 to identify processing workloads at the GPU 102. In some embodiments, such as illustrated in FIG. 1, the GPU performance module 118 includes a utilization monitor 124, one or more temperature sensors 126, and one or more power sensors 128. The utilization monitor 124 monitors the graphics pipeline 114 for its utilization (e.g., how busy it is) and generates a busy percentage metric representing, for example, a percentage level of activity of the CUs 122 in the graphics pipeline 114.

The one or more temperature sensors 126 measure the operating temperature of the GPU 102. The one or more temperature sensors 126 can be any type of temperature sensing circuitry. In some embodiments, when more than one temperature sensor is implemented, the temperature sensors can be physically distributed over the surface of the GPU and is not limited to being physically distributed within the GPU performance module 118. The one or more power sensors 128 measure power consumption of the GPU 102. In some embodiments, the one or more power sensors 128 receive data from a power measurement circuit (not shown) that measures current flow from a power supply of the GPU 102 to determine power consumption. In other embodiments, the one or more power sensors 128 estimate power consumption based on the activity levels in the GPU 102. For example, the one or more power sensors 128 may be configured to read a variety of performance counters in the GPU 102 to derive an estimation of the power consumption.

Performance of the GPU 102 is dependent upon a plurality of operating parameters, including, but not limited to: a GPU processor core clock rate of the GPU 102, memory clock rate of a GPU memory (e.g., a frame buffer), and other associated settings necessary for the clock rates, such as reference voltages applied to core clocks and memory clocks, fan speed (e.g., to provide cooling), memory timings, etc. Generally, the performance of the GPU 102 (e.g., in frames per second (FPS)) increases with increasing core clock rates and increasing memory clock rates.

The power and clock controller module 120 includes control elements to control parameters for power management of the GPU 102. In one embodiment, the power and clock controller module 120 includes a core clock and voltage controller 130 and a memory clock and voltage controller 132. The core clock and voltage controller 130 generates a core clock signal and a core voltage signal for the GPU 102. Similarly, the memory clock and voltage controller 132 generates a memory clock signal and a memory voltage signal for the GPU 102.

The power and clock controller module 120 implements voltage and frequency scaling to adapt voltage and/or clock levels of GPU processor cores and GPU to switch between a set of pre-defined GPU settings (e.g., each with distinct clock and voltage levels). The set of pre-defined GPU settings includes various configurations for the GPU 102 that provide different levels of GPU performance at a given power consumption, including at least a plurality of performance optimized set of GPU settings and a plurality of power optimized set of GPU settings. In an embodiment, the GPU settings may include a voltage magnitude and an operating frequency. The combination of power supply voltage magnitude and operating frequency is generally referred to herein as a "power level." The power supply voltage magnitude may be the magnitude of the power supply voltage supplied to the GPU processor cores and/or GPU memory. The operating frequency may be the frequency of the clock or clocks supplied to the GPU processor cores and/or GPU memory. Generally, the higher the operating frequency and/or voltage supplied to the GPU, the higher the performance and the power consumption.

As described in further detail herein, the GPU driver 110 performs dynamic power level management by periodically determining a new GPU setting (i.e., power level) based on the past behavior of the processing system 100 and a current and/or upcoming workload. The new GPU setting is determined based on a prediction of optimized settings for future behavior based on the past behavior, using a fixed time interval (referred to herein as a "measurement cycle" or a "cycle"). In each measurement cycle, the GPU driver 110 predicts optimized settings for the next cycle based on a plurality of inputs, including at least one of hardware signals from the GPU performance module 118, calculated performance metrics, and types of workloads being processed by the GPU 102.

For example, in each measurement cycle, the hardware signals from the GPU performance module 118 are used to calculate one or more of an average busy percentage metric from the utilization monitor 124, an average temperature metric from the one or more temperature sensors 126, and an average accumulated power consumed during the measurement cycle from the one or more power sensors 128. Other inputs such as calculated performance measurements (e.g., FPS, throughput, submissions per unit time) and types of workloads/use cases being processed by the GPU 102 (e.g., analytics, visualization, 3D image rendering, artificial intelligence processing, general compute functions, etc.) are also taken into consideration in predicting power level settings to be applied for a future cycle. Additionally, in some embodiments, the GPU driver 110 also considers an expected future processing workload in predicting power level settings to be applied for the future cycle.

Figure 2:
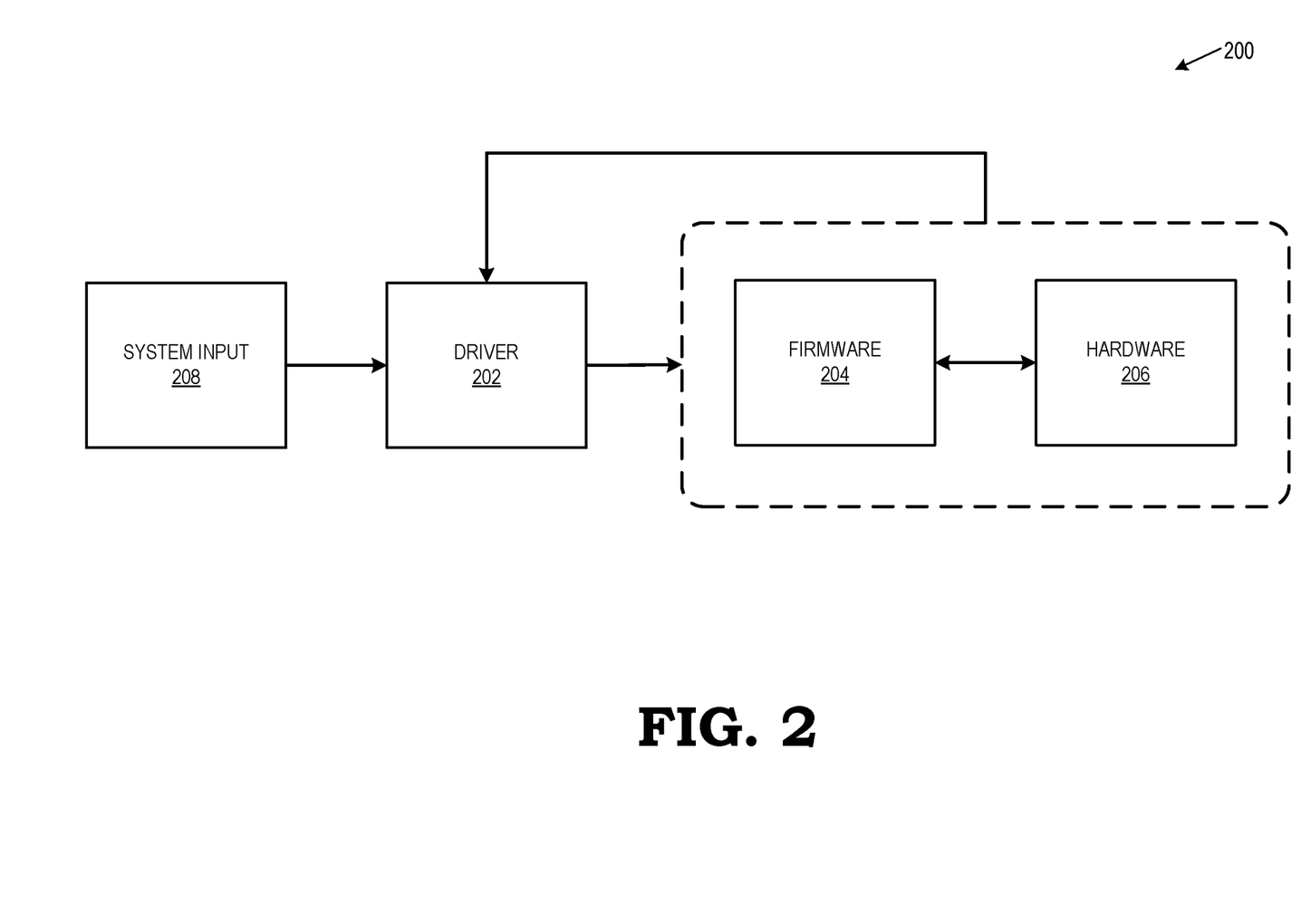
FIG. 2 is a block diagram illustrating a power control loop for performing dynamic power level management at the processing system of FIG. 1 in accordance with some embodiments.

FIG. 2 is a block diagram illustrating a power control loop 200 for performing dynamic power level management at the processing system of FIG. 1 in accordance with some embodiments. Although described here in the context of a current measurement cycle and a next cycle, one of ordinary skill in the art will recognize that the power level management operations described can be applied over any number of cycles. For a current measurement cycle, the driver 202 (such as the GPU driver 110 of FIG. 1) receives input from firmware 204 and hardware 206 associated with a GPU (such as the GPU 102 of FIG. 1). The firmware 204 is configured to employ hardware signals from the hardware 206 (e.g., data from the GPU performance module 118) to calculate at least one of an average activity percentage metric, an average temperature metric, and an average power consumed metric. Additionally, the driver 202 also receives other system input 208, such as calculated performance measurements (e.g., FPS, throughput, submissions per unit time) and types of workloads/use cases being processed by the GPU 102 (e.g., analytics, visualization, 3D image rendering, artificial intelligence processing, general compute functions, etc.). In some embodiments, the other system input 208 can be provided to the driver by an operating system (such as OS 108 of FIG. 1) and/or a CPU (such as CPU 104 of FIG. 1).

In one embodiment, the firmware 204 calculates an average activity percentage metric, representing a percentage level of utilization activity in the GPU, for the current measurement cycle. The average activity percentage metric (which may be expressed in percentage terms ranging from 0-100%) represents, for example, a percentage level of activity of compute units in the GPU (e.g., CUs 122 in the graphics pipeline 114 of FIG. 1). The driver 202 receives the average activity percentage metric from the firmware 204 and compares the average activity percentage metric against a pre-determined activity threshold.

After the calculated average activity percentage metric reaches the pre-determined activity threshold (i.e., indicative of a higher level of processing activity at the GPU), the firmware 204 determines whether to adjust the power level of the GPU to a different clock and/or voltage setting. In some embodiments, firmware 204 determines whether the power level should be adjusted based on pre-determined up- and down-hysteresis levels. If the average activity percentage metric is at or above the pre-determined activity threshold for a given current measurement cycle, the firmware 204 repeatedly checks over a number of future cycles whether the average activity percentage metric continues to be maintained at or above the activity threshold (i.e., indicative of a higher level of processing activity at the GPU) before adjusting the power level of the GPU by increasing the operating frequency and/or voltage supplied to the GPU. Up-hysteresis and down-hysteresis levels provide a dynamic lag between when the average activity percentage metric cross the activity threshold and when the firmware 204 adjusts the power level to prevent undesirable frequent switching. For example, given a hypothetical activity threshold of 50% GPU utilization, it would be inefficient and undesirable to change power levels when the activity percentage metric oscillates from 49% to 51% between one measurement cycle and another.

The up-hysteresis level provides a minimum number of consecutive cycles that the activity percentage metric must be maintained at or above the activity threshold before adjusting the power level of the GPU by increasing the operating frequency and/or voltage supplied to the GPU. Accordingly, the higher that the up-hysteresis level is set, the slower and less likely that firmware 204 will increase the power level. The lower that the up-hysteresis level is set, the faster and more likely that firmware 204 will increase the power level. Similarly, if the activity percentage metric is below the activity threshold, firmware 204 will repeatedly check over a number of future cycles whether the average activity percentage metric continues to be maintained below the activity threshold (i.e., indicative of a lower level of processing activity at the GPU) before adjusting the power level of the GPU by decreasing the operating frequency and/or voltage supplied to the GPU. The down-hysteresis level provides a minimum number of consecutive cycles that the activity percentage metric must be maintained below the activity threshold before decreasing the power level of the GPU. Accordingly, the higher that the down-hysteresis level is set, the slower and less likely that firmware 204 will decrease the power level; the firmware 204 will hold the power level at a higher level for longer periods of time. The lower that the down-hysteresis level is set, the faster and more likely that firmware 204 will allow the power level to fall.

In some embodiments, the driver 202 determines whether the power level should be adjusted based on Table 1 provided below.

TABLE 1

Comparison of Activity Percentage Metric vs. Activity Threshold

| ACTIVITY PERCENTAGE | UP-HYSTERESIS | DOWN-HYSTERESIS | ACTIVITY THRESHOLD |
|---|---|---|---|
| >= THRESHOLD | DECREASE | INCREASE | DECREASE |
| < THRESHOLD | INCREASE | DECREASE | INCREASE |

According to Table 1, when the activity percentage metric is at or above the activity threshold, the driver 202 prefers power level settings favoring performance optimization by decreasing the up-hysteresis levels, increasing the down-hysteresis levels, and/or decreasing the activity thresholds required to adjust to higher power level settings. When the activity percentage metric (i.e., busy signal) is below the activity threshold, the driver 202 prefers power level settings favoring power optimization and conservation by increasing the up-hysteresis levels, decreasing the down-hysteresis levels, and/or increasing the activity thresholds required to adjust to higher power level settings.

Figure 3:
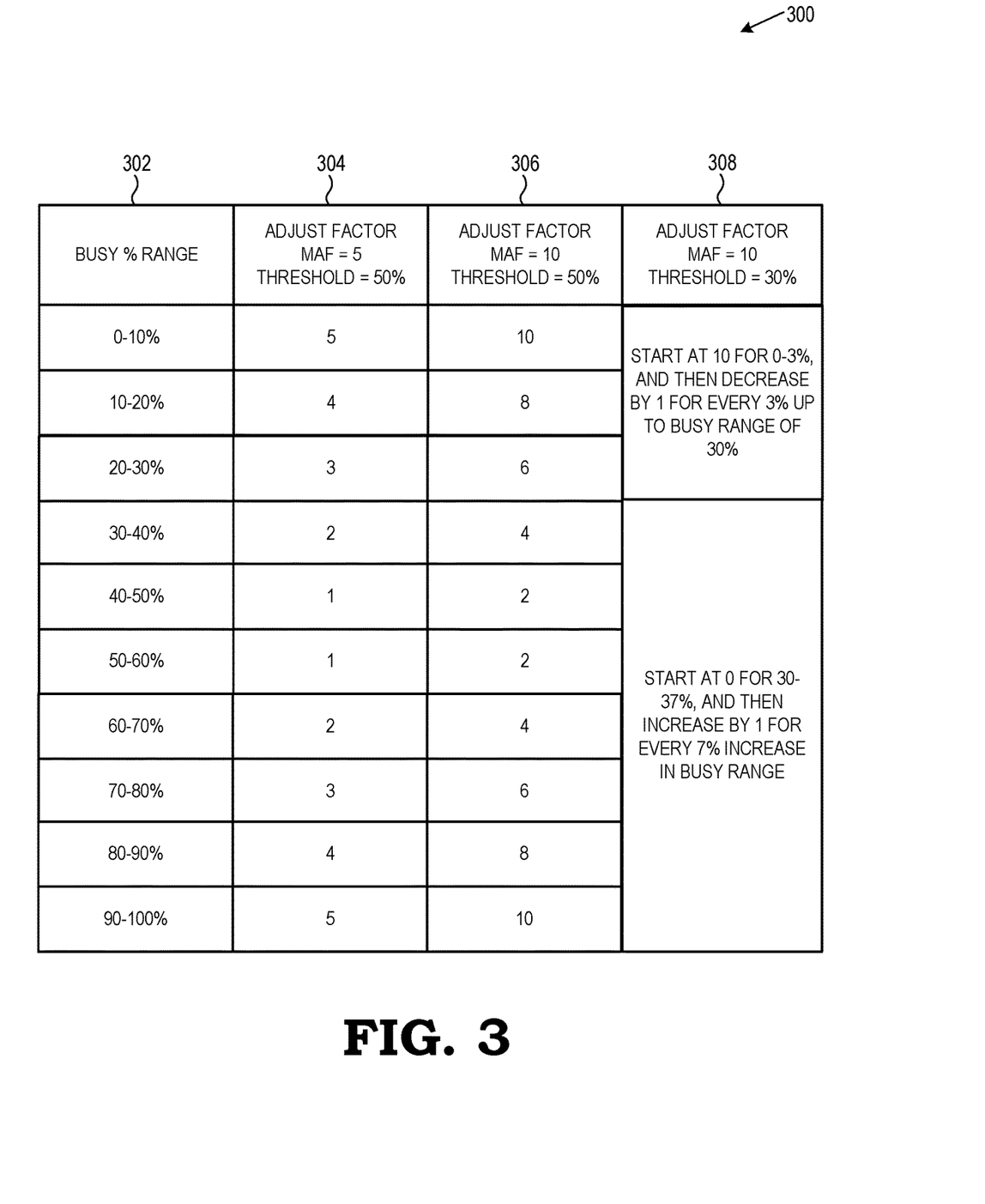
FIG. 3 is a diagram illustrating various power level adjustment factors employed by the power control loop of FIG. 1 in accordance with some embodiments.

In some embodiments, the amount by which power level settings can be adjusted from one cycle to another is further calculated based on how far away the activity percentage metric (i.e., busy signal) is above or below the activity threshold. FIG. 3 is a table diagram 300 illustrating various power level adjustment factors in accordance with some embodiments. In table diagram 300, column 302 represents the activity percentage metric and the maximum amount that a power level setting can change from one cycle to another is referred to as a Maximum Adjustment Factor (MAF).

In the embodiment of column 304, a GPU driver (e.g., driver 202 of FIG. 2) is configured to have an activity threshold of 50%, a range of adjustment factors from 1-5, and a MAF of 5. This configuration can be applied to, for example, a general compute function processing at the GPU. Assuming that the up- and/or down-hysteresis levels are met, the embodiment of column 304 shows that the adjustment factors (i.e., amount of how much the power level settings can change from a current measurement cycle to a future, next measurement cycle) are dependent upon a degree of difference between the activity percentage metric (i.e., busy signal) for a current measurement cycle and the activity threshold. For example, busy signals in the range of 40-60% are assigned an adjustment factor of "1," whereas busy signals in the range of 0-10% or 90-10% are assigned an adjustment factor of "5" due to their relative proximity and distance to the activity threshold of 50%, respectively.

One of ordinary skill in the art will recognize that the adjustment factors discussed herein are not intended to be associated with any particular power levels (e.g., specific voltages or operating frequencies) or ratios between the power levels. Rather, the adjustment factors are provided to show a relative difference in the magnitude of power level adjustments. For example, the power level setting for a future measurement cycle based on an adjustment factor of "2" will be greater in magnitude than that based on an adjustment factor of "1." Similarly, the power level setting for a future measurement cycle based on an adjustment factor of "3" will be greater in magnitude than those based on either adjustment factor of "1" or "2," and so on and so forth.

In the embodiment of column 306, a GPU driver (e.g., driver 202 of FIG. 2) is configured to have an activity threshold of 50%, a range of adjustment factors from 2-10, and a MAF of 10. This configuration can be applied to, for example, high activity graphics-processing workload such as gaming applications or 3D renderings where it is desirable to more quickly increase power levels and GPU performance (albeit at the cost of power savings). For example, busy signals in the embodiment of column 306, the range of 50-60% are assigned an adjustment factor of "2" (in contrast to the busy signals in the range of 60-70% for the embodiment of column 304 being assigned the same adjustment factor of "2"). Accordingly, the embodiment of column 304 requires a higher measured activity percentage than the embodiment of column 306 to reach the same power level setting. Alternatively, the difference in adjustment factors and MAF illustrate that it may take multiple cycles for the embodiment of column 304 to reach the power level that the embodiment of column 306 reaches in a single cycle.

In the embodiment of column 308, a GPU driver (e.g., driver 202 of FIG. 2) is configured to have an activity threshold of 30%, a range of adjustment factors from 0-10, and a MAF of 10. Such a configuration can be applied to, for example, processing systems in which it is desirable to account for power consumption with more granularity (e.g., laptops running on battery power). Assuming that the up- and/or down-hysteresis levels are met, the embodiment of column 308 shows that the lower activity threshold of 30% allows for a power savings oriented setting in which power levels are allowed to decrease twice as fast (i.e., change in adjustment factor by "1" for every three-percentage-point change in measured activity) than they are allowed to rise (i.e., change in adjustment factor by "1" for every seven-percentage-point change in measured activity above the 30% threshold).

It should be recognized that the embodiments of columns 304-308 are provided as examples of how power settings can be adjusted to account for performance metrics including, for example, different processing workloads and hardware configurations. One of ordinary skill in the art will understand that such embodiments are not intended to limit the scope of the teachings provided herein to the specifically described embodiments.

Figure 4:
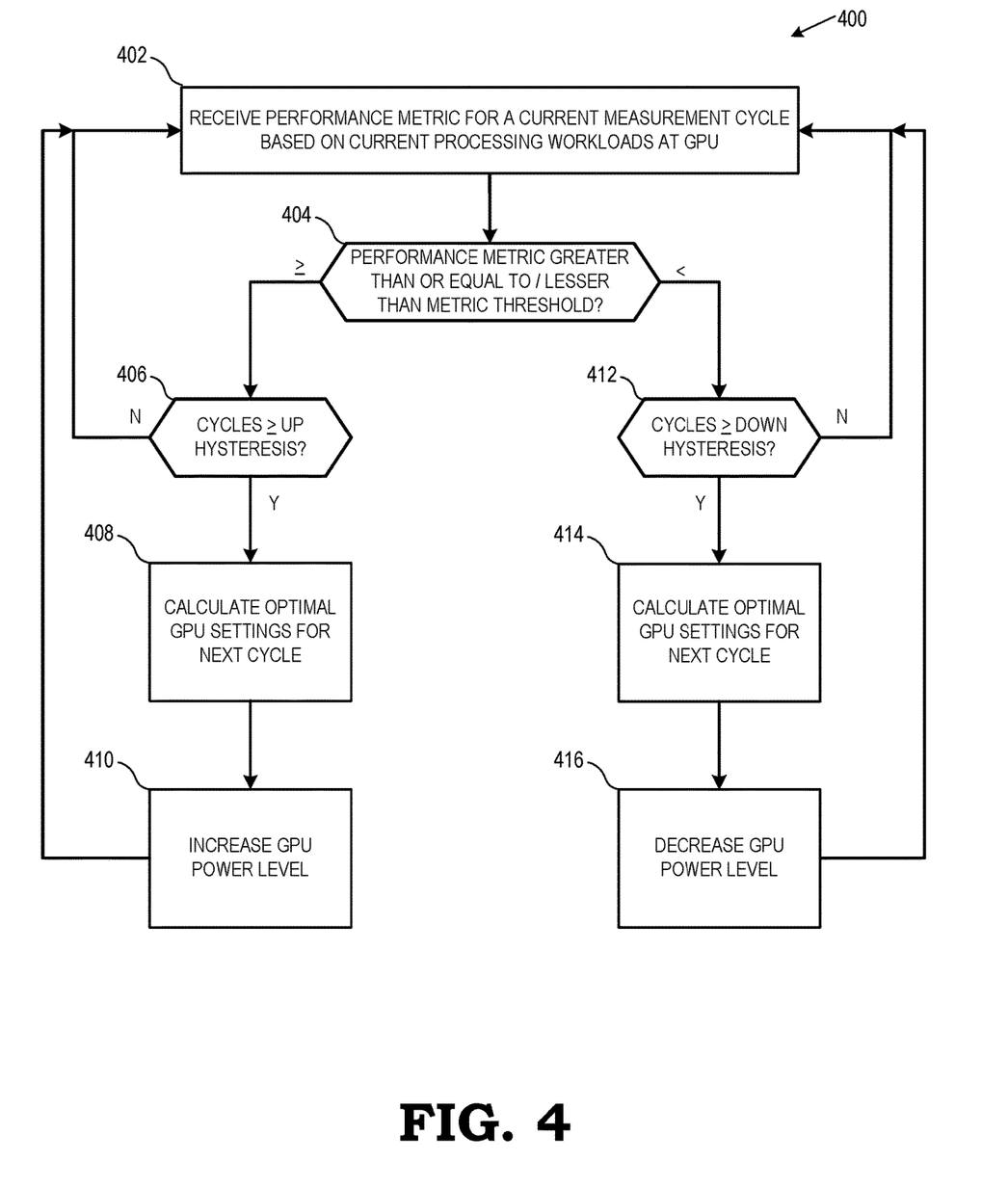
FIG. 4 is a flow diagram of a method of performing adaptive power control in accordance with some embodiments.

FIG. 4 is a flow diagram of a method 400 of performing adaptive power control in accordance with some embodiments. At block 402, the method 400 begins by receiving a performance metric for a current measurement cycle based on currently processing workloads at the GPU. In one embodiment, such as described above with respect to FIGS. 1 and 2, a GPU driver receives input from GPU firmware and hardware. The firmware is configured to take hardware signals from the hardware (e.g., data from the GPU performance module 118 described relative to FIG. 1) to calculate the performance metric, which includes at least one of an average activity percentage metric, an average temperature metric, and an average power consumed metric. Additionally, the GPU driver also receives other system input, such as an identification of the type of workloads/use cases being processed by the GPU 102 (e.g., low-activity workloads such as general compute functions or high-activity workloads such as analytics, visualization, 3D image rendering, artificial intelligence processing, etc.), specific hardware configurations of the processing system (e.g., amount of RAM memory, type of CPU, etc.), and calculated performance measurements (e.g., FPS, throughput, submissions per unit time) for the current measurement cycle. Accordingly, the GPU driver has an overview of not only the specific workloads that the GPU is processing from one measurement cycle to another, but also receives performance metrics indicative of how the specific hardware configuration performs those workloads.

At block 404, the received performance metric for the current measurement cycle is compared against a pre-determined metric threshold to determine whether the GPU driver should adjust a GPU power level from its current settings in the current measurement cycle to different settings in the next measurement cycle. In one embodiment, such as described relative to FIGS. 2 and 3, the performance metric comprises an activity percentage metric indicative of how much workload the GPU hardware is processing per unit time (i.e., per measurement cycle). Once the activity percentage metric meets or exceeds a pre-determined activity percentage threshold, the GPU driver proceeds to block 406 and attempts to increase a power level of the GPU (e.g., operating frequency or voltage applied to the GPU) to a next higher level that provides increased performance.

One of ordinary skill in the art will recognize that the embodiments are described specifically in the context of activity percentages, the dynamic power level management operations described herein are applicable in conjunction with, or alternatively excluding activity percentages and in favor of, other performance metrics such as average operating temperature at the GPU, average power consumed by the GPU, or other performance-related data captured by (or derivable from data captured by) sensors/monitors in a GPU performance module (e.g., GPU performance module 118 of FIG. 1). For example, in some embodiments, the method 400 can consider average operating temperature in conjunction with average activity percentages to enable the GPU to reduce power levels and cool down faster during non-intensive or low-activity workloads if the GPU driver detects that the GPU is overheating.

At block 406, the GPU driver determines whether the received performance metric has exceeded the metric threshold for a number of consecutive cycles exceeding a minimum hysteresis number. In one embodiment, such as described relative to FIGS. 2 and 3, the hysteresis number includes up- and/or down-hysteresis levels that define a minimum number of consecutive measurement cycles that the activity percentage metric must be maintained at or above the activity threshold to allow for an adjustment to the power level settings of the GPU. For example, the up-hysteresis level defines a minimum number of consecutive cycles that the activity percentage metric must be maintained at or above the activity threshold before increasing the power level of the GPU. Similarly, the down-hysteresis level defines a minimum number of consecutive cycles that the activity percentage metric must be maintained below the activity threshold before decreasing the power level of the GPU. It should be appreciated that the exact values for the up- and down-hysteresis levels is a matter of design choice and is therefore not discussed herein.

If the GPU driver determines at block 406 that the received performance metric has not met the metric threshold for a number of consecutive cycles exceeding the minimum up-hysteresis number, the method 400 returns to block 402. If the GPU driver determines at block 406 that the received performance metric has met the metric threshold for a number of consecutive cycles exceeding the minimum up-hysteresis number, the method 400 proceeds to block 408.

At block 408, the GPU driver determines an estimated optimization of GPU settings to be applied to the GPU for the next measurement cycle. In one embodiment, such as described relative to FIG. 1, the estimated optimization of GPU settings (e.g., voltage and frequency for core clock and memory clocks of the GPU) can be determined from a set of pre-defined GPU settings includes various configurations for the GPU that provide different levels of GPU performance at a given power consumption, including at least a plurality of performance optimized set of GPU settings and a plurality of power optimized set of GPU settings. The set of pre-defined GPU settings are selected based on, for example, data from systems with static power level settings to provide a range of settings representing performance optimized set of settings as one end of a spectrum to power optimized set of settings as the other end. As described in this disclosure, the dynamic power level management operation does not increase power levels based only on activity percentage metrics exceeding static, pre-defined threshold. Rather, the exceeding of the performance metrics described herein operate as a prerequisite for the GPU driver to determine estimated optimization of GPU settings based on a consideration of other factors particular to the current workload (e.g., differences in OS, differences in ambient temperature of environment, difference in workload for an application running on the OS, and differences in hardware configuration for the processing system such as RAM, CPU, motherboard, chipsets, etc.). Further, the optimal settings can be estimated based on preset settings for typical behavior of different APIs (DirextX® 9 (DX9), DX10, DX11, DX12, etc.). Additionally, the optimal settings can be estimated based not only on workloads from the current and previous measurement cycles, but can also include information relating to an expected future workload as scheduled for execution by the GPU scheduler.

At block 410, the GPU driver instructs the GPU to adjust a power level setting at the GPU for the future measurement cycle based on the estimated optimization. In one embodiment, as described relative to FIG. 1, the GPU driver instructs a power and clock controller module at the GPU (e.g., power and clock controller module 120 of FIG. 1) to switch between the set of pre-defined GPU settings (e.g., each with distinct clock and voltage levels) that each provide different levels of GPU performance at a given power consumption. In some embodiments, the power and clock controller module includes a core clock and voltage controller and a memory clock and voltage controller to generate clock and voltage signals for the GPU.

Returning now to block 404, if it is determined that the activity percentage metric is below the pre-determined activity percentage threshold, the GPU driver proceeds to block 412 and attempts to decrease a power level of the GPU (e.g., operating frequency or voltage applied to the GPU) to a next lower level that provides decreased performance and improved power savings. At block 412, the GPU driver determines whether the received performance metric has exceeded the metric threshold for a number of consecutive cycles exceeding a minimum hysteresis number. If the GPU driver determines at block 412 that the received performance metric has not met the metric threshold for a number of consecutive cycles exceeding the minimum down-hysteresis number, the method 400 returns to block 402. If the GPU driver determines at block 412 that the received performance metric has met the metric threshold for a number of consecutive cycles exceeding the minimum down-hysteresis number, the method 400 proceeds to block 414.

At block 414, the GPU driver determines an estimated optimization of GPU settings to be applied to the GPU for the next measurement cycle. The operations of block 414 are similar to those previously described relative to block 408, except that the estimated optimization are for lower power levels providing for decreased performance and increased power savings instead of the estimations providing for improved performance of block 408. At block 416, the GPU driver instructs the GPU to adjust a power level setting at the GPU for the future measurement cycle based on the estimated optimization (similar to the operations of block 410).

It should be appreciated that the dynamic power management operation does not conclude at blocks 410 and/or 416. Rather, the GPU periodically performs the operations of method 400 to dynamically adapt the power levels to optimize power savings and performance increases based on the workloads being processed at any given time. This allows the GPU to remain in power savings oriented settings, and after high-activity workloads begin processing, the GPU transitions towards performance oriented settings, and then back to power savings oriented settings after the GPU idles again. For example, as illustrated in FIG. 4, after blocks 410 and 416 for a current measurement cycle, the method 400 loops back to block 402 such that modified power level settings from the current measurement cycle can be provided as input for determining power level settings for future measurement cycles.

Although the exact cycle period of measurement cycles is not explicitly defined herein, one skilled in the art will recognize that the GPU driver can be configured to change the cycle period (where decreasing the cycle period will increase the granularity/accuracy of the power level management operations and decrease the amount of time between changing of power levels [at the cost of adding CPU load to operate the GPU more often]; increasing the cycle period decreases CPU load attributable to dynamic power level management operations at the cost of decreased accuracy).

In some embodiments, the apparatus and techniques described above are implemented in a system comprising one or more integrated circuit (IC) devices (also referred to as integrated circuit packages or microchips), such as the GPU described above with reference to FIGS. 1-4. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   identifying a first performance metric associated with processing a current workload at a graphics processing unit (GPU) has a first relationship to a threshold for a number of consecutive measurement cycles, wherein the number of consecutive measurement cycles includes a current measurement cycle and at least one previous measurement cycle, the first performance metric indicative of GPU performance while processing the current workload;

in response to the number of consecutive measurement cycles exceeding one of an up-hysteresis level and a down-hysteresis level, determining, based on data representing a hardware configuration of a current computing environment processing the current workload, an estimated optimization to be applied to the GPU for a future measurement cycle; and adjusting, based on the estimated optimization, a power level setting at the GPU by adjusting one of the up-hysteresis level and the down-hysteresis level for the future measurement cycle.

2. The method of claim 1, wherein adjusting the power level setting comprises changing at least one of a core clock frequency and a memory clock frequency at the GPU.

3. The method of claim 1, wherein identifying the first performance metric comprises identifying at least one of an average utilization percentage of the GPU, an average operating temperature of the GPU, and an average accumulated power consumed during the current measurement cycle.

4. The method of claim 1, wherein identifying the first performance metric comprises identifying the first performance metric based on a current processing workload of the GPU for the current measurement cycle and based on an expected future processing workload of the GPU for the future measurement cycle.

5. The method of claim 1, wherein adjusting the power level setting comprises adjusting the up-hysteresis level.

6. The method of claim 1, wherein adjusting the power level setting comprises adjusting the down-hysteresis level.

7. The method of claim 1, wherein adjusting the power level setting at the GPU comprises adjusting the power level setting for the future measurement cycle by a magnitude of a current power level at the GPU based on a difference between the identified first performance metric and a performance metric threshold.

8. A non-transitory computer readable medium embodying a set of executable instructions, the set of executable instructions to manipulate a processor to:

identify a first performance metric associated with processing a current workload at a graphics processing unit (GPU) has a first relationship to a threshold for a number of consecutive measurement cycles, wherein the number of consecutive measurement cycles includes a current measurement cycle and at least one previous measurement cycle, the first performance metric indicative of GPU performance while processing the current workload;

in response to the number of consecutive measurement cycles exceeding one of an up-hysteresis level and a down-hysteresis level, determine an estimated optimization to be applied to the GPU for a future measurement cycle; and adjust a power level setting at the GPU for the future measurement cycle by adjusting one of the up-hysteresis level and the down-hysteresis level based on the estimated optimization.

9. The non-transitory computer readable medium of claim 8, wherein adjusting the power level setting comprises changing at least one of a core clock frequency and a memory clock frequency at the GPU.

10. The non-transitory computer readable medium of claim 8, wherein identifying the first performance metric comprises identifying at least one of an average utilization percentage of the GPU, an average operating temperature of the GPU, and an average accumulated power consumed during the current measurement cycle.

11. The non-transitory computer readable medium of claim 8, wherein adjusting the power level comprises adjusting the up-hysteresis level.

12. The non-transitory computer readable medium of claim 8, wherein adjusting the power level comprises adjusting the down-hysteresis level.

13. A device, comprising:
a graphics processing unit (GPU) comprising:
a graphics pipeline including a plurality of compute units (CUs);
a performance module to:
identify a first performance metric associated with processing a current workload at the GPU has a first relationship with a threshold for a number of consecutive measurement cycles, wherein the consecutive number of consecutive measurement cycles includes a current measurement cycle and at least one previous measurement cycle, the first performance metric indicative of GPU performance while processing the current workload;
in response to the number of consecutive measurement cycles exceeding one of an up-hysteresis level and a down-hysteresis level, determine, based on data representing a hardware configuration of the device, an estimated optimization to be applied to the GPU for a future measurement cycle; and
a power and clock controller module to adjust a power level setting at the GPU based on the estimated optimization by adjusting one of the up-hysteresis level and the down-hysteresis level.

14. The device of claim 13, wherein the estimated optimization is selected from a set of pre-defined power level settings including a plurality of performance optimized setting and a plurality of power savings optimized settings.

15. The device of claim 14, wherein the power and clock controller module is further configured to adjust at least one of a core clock frequency and a memory clock frequency at the GPU based on the estimated optimization.

16. The device of claim 13, wherein the performance module is further configured to identify at least one of an average utilization percentage of the GPU, an average operating temperature of the GPU, and an average accumulated power consumed during the current measurement cycle.

17. The device of claim 13, wherein the device further comprises a GPU firmware configured to calculate the first performance metric based on sensor data captured at the performance module.

* * * * *